(12) United States Patent
Lavoie et al.

(10) Patent No.: US 12,128,838 B2
(45) Date of Patent: Oct. 29, 2024

(54) METHODS AND SYSTEMS FOR OPERATING AN AUXILIARY POWER UNIT

(71) Applicant: BOMBARDIER INC., Dorval (CA)

(72) Inventors: Claude Lavoie, Laval (CA); Marek Hicar, Hudson (CA)

(73) Assignee: BOMBARDIER INC., Dorval (CA)

( * ) Notice: Subject to any disclaimer, the term of this patent is extended or adjusted under 35 U.S.C. 154(b) by 916 days.

(21) Appl. No.: 17/105,731

(22) Filed: Nov. 27, 2020

(65) Prior Publication Data

US 2021/0155179 A1 May 27, 2021

Related U.S. Application Data

(60) Provisional application No. 62/940,970, filed on Nov. 27, 2019.

(51) Int. Cl.
| | |
|---|---|
| *H02H 3/08* | (2006.01) |
| *B60R 16/03* | (2006.01) |
| *B64D 41/00* | (2006.01) |
| *H02H 9/02* | (2006.01) |
| *H02J 4/00* | (2006.01) |

(52) U.S. Cl.
CPC ............. *B60R 16/03* (2013.01); *B64D 41/00* (2013.01); *H02H 3/08* (2013.01); *H02J 4/00* (2013.01); *B64D 2041/002* (2013.01); *B64D 2221/00* (2013.01); *H02J 2310/44* (2020.01)

(58) Field of Classification Search
CPC ........... F05D 2220/50; F05D 2270/313; F05D 2270/335; H02J 2310/44; H02J 4/00

USPC ..................................................... 361/1, 93.1
See application file for complete search history.

(56) References Cited

U.S. PATENT DOCUMENTS

| | | | |
|---|---|---|---|
| 7,254,465 B2 | 8/2007 | McGinley | |
| 7,367,193 B1 | 5/2008 | Thomson | |
| 7,417,337 B1 | 8/2008 | Suttie | |
| 7,581,119 B2* | 8/2009 | Tupman | G06F 1/266 |
| | | | 713/340 |
| 8,061,650 B2 | 11/2011 | Nguyen et al. | |
| 9,845,806 B2 | 12/2017 | Pascu et al. | |
| 10,240,521 B2 | 3/2019 | Jones et al. | |
| 10,822,996 B2* | 11/2020 | Dowdell | F01D 21/003 |
| 2008/0211237 A1* | 9/2008 | Berenger | H02J 3/12 |
| | | | 290/40 B |
| 2010/0019574 A1* | 1/2010 | Baldassarre | H02J 9/06 |
| | | | 307/64 |
| 2010/0153680 A1* | 6/2010 | Baum | G11B 5/5565 |
| | | | 711/E12.002 |
| 2014/0125121 A1 | 5/2014 | Edwards et al. | |

* cited by examiner

*Primary Examiner* — Jared Fureman
*Assistant Examiner* — Lucy M Thomas
(74) *Attorney, Agent, or Firm* — Norton Rose Fulbright Canada LLP

(57) ABSTRACT

Methods and systems for operating an auxiliary power unit (APU) of an aircraft are described. The method comprises obtaining external environment parameters of the aircraft, determining an available output power for the APU as a function of the external environment parameters, and setting an overcurrent protection threshold of the APU to a level associated with the available output power.

20 Claims, 6 Drawing Sheets

METHODS AND SYSTEMS FOR OPERATING AN AUXILIARY POWER UNIT

CROSS-REFERENCE TO RELATED APPLICATIONS

The present application claims the benefit of U.S. Provisional Patent Application No. 62/940,970 filed on Nov. 27, 2019, the contents of which are hereby incorporated by reference in their entirety.

TECHNICAL FIELD

The present disclosure relates generally to auxiliary power units (APUs) and more particularly to dynamically controlling an overcurrent protection threshold in an APU.

BACKGROUND OF THE ART

An auxiliary power unit (APU) is a device on a vehicle, such as an aircraft, that provides energy for functions other than propulsion. An aircraft APU can serve as an additional energy source to start one of the main engines. The APU (separate from or integrated with a generator) can also operate as an electrical generator to power the aircraft electrical loads such as system controllers, high current power consumers, cockpit avionics, aircraft heating, cooling systems, and the like.

In many electric power systems, including APUs, overcurrent or excess current is a situation that occurs when a larger than intended electric current exists in the system, leading to excessive generation of heat and the risk of fire or damage to the equipment. This scenario is prevented by imposing an overcurrent protection, whereby the electric power system is not permitted to operate beyond a current limit or threshold.

An APU is generally designed to operate at a predetermined point of its operating envelope, i.e. the range of parameters in which operation will result in safe and acceptable performance. The overcurrent protection is set for the available power output at the predetermined point of the operating envelope. In this architecture, the full power of the APU over its operating envelope is not used.

Therefore, improvements are needed.

SUMMARY

In accordance with a broad aspect, there is provided a method for operating an auxiliary power unit (APU) of an aircraft. The method comprises obtaining external environment parameters of the aircraft, determining an available output power for the APU as a function of the external environment parameters, and setting an overcurrent protection threshold of the APU to a level associated with the available output power.

In some embodiments, the external environment parameters comprise altitude of the aircraft and outside air temperature.

In some embodiments, obtaining the external environment parameters comprises measuring the external environment parameters.

In some embodiments, the method further comprises comparing the overcurrent protection threshold to an actual current of the APU and shedding electrical loads when the actual current exceeds the overcurrent protection threshold.

In some embodiments, the method further comprises detecting a change in the external environment parameters by obtaining updated external environment parameters, determining an updated available output power as a function of the updated external environment parameters, and setting an updated overcurrent protection threshold of the APU to a level associated with the updated available output power.

In some embodiments, setting the updated overcurrent protection threshold comprises applying a time delay to confirm the updated external environment parameters.

In some embodiments, the method further comprises performing load management as a function of the updated overcurrent protection threshold.

In some embodiments, the APU operates as a generator in a bleed or bleedless system.

In some embodiments, setting the overcurrent protection threshold comprises selecting the overcurrent protection threshold from a list of predetermined overcurrent protection thresholds having respective output power ranges associated thereto.

In some embodiments, determining an available output power comprises selecting the available output power from a look-up table.

In accordance with another broad aspect, there is provided a system for operating an auxiliary power unit (APU) of an aircraft. The system comprises a processing unit and a non-transitory computer readable medium having stored thereon program instructions. The program instructions are executable by the processing unit for obtaining external environment parameters of the aircraft, determining an available output power for the APU as a function of the external environment parameters, and setting an overcurrent protection threshold of the APU to a level associated with the available output power.

In some embodiments, the external environment parameters comprise altitude of the aircraft and outside air temperature.

In some embodiments, obtaining the external environment parameters comprises measuring the external environment parameters.

In some embodiments, the program instructions are further executable for comparing the overcurrent protection threshold to an actual current of the APU and shedding electrical loads when the actual current exceeds the overcurrent protection threshold.

In some embodiments, the program instructions are further executable for detecting a change in the external environment parameters by obtaining updated external environment parameters, determining an updated available output power as a function of the updated external environment parameters, and setting an updated overcurrent protection threshold of the APU to a level associated with the updated available output power.

In some embodiments, setting the updated overcurrent protection threshold comprises applying a time delay to confirm the updated external environment parameters.

In some embodiments, the program instructions are further executable for performing load management as a function of the updated overcurrent protection threshold.

In some embodiments, setting the overcurrent protection threshold comprises selecting the overcurrent protection threshold from a list of predetermined overcurrent protection thresholds having respective output power ranges associated thereto.

In some embodiments, determining an available output power comprises selecting the available output power from a look-up table.

In accordance with yet another broad aspect, there is provided a non-transitory computer-readable medium having stored thereon program instructions executable by a processor for operating an auxiliary power unit. The program instructions are configured for obtaining external environment parameters of the aircraft, determining an available output power for the APU as a function of the external environment parameters, and setting an overcurrent protection threshold of the APU to a level associated with the available output power.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
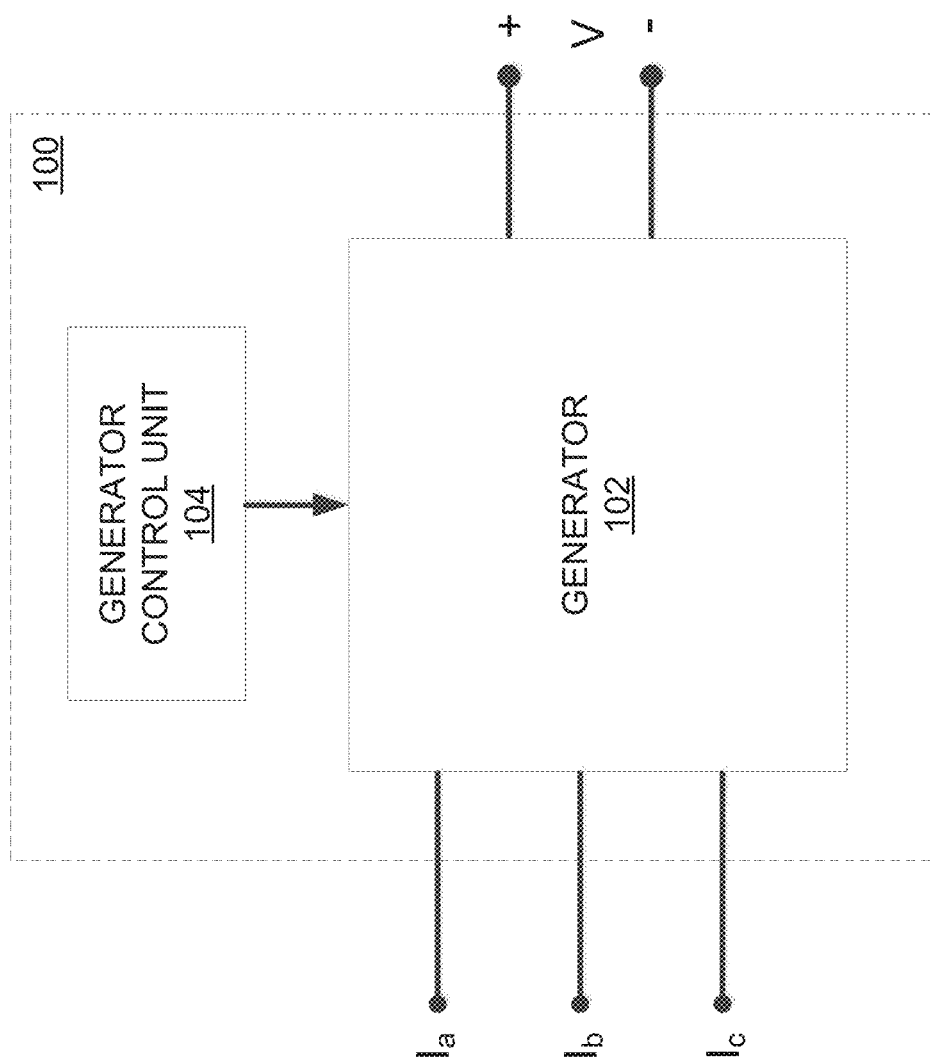
FIG. 1 is a block diagram of an example auxiliary power unit.

FIG. 1 illustrates an auxiliary power unit (APU) 100 which may be used, for example, in an aircraft. The APU 100 may be used for general aviation, light helicopter and regional aircraft platforms, large helicopters, larger business jets, and/or commercial aircraft. The APU 100 comprises a generator 102 and a generator control unit (GCU) 104 operatively coupled thereto.

The generator 102 may be a synchronous generator with permanent magnet excitation (PMSG), operable as a single phase, or a multi-phase system for generating alternating current (AC) or direct current (DC) power. The generator 102 may be designed to operate under the principles of constant speed constant frequency (CSCF), constant speed variable frequency (CSVF), or variable speed variable frequency (VSVF). In some embodiments, the generator 102 is a brushed generator having ratings ranging from 20 to 250 kVA. Alternatively, the generator 102 is a brushless generator having ratings ranging from 20 to 250 kVA. The generator 102 may be air cooled, oil cooled, or cooled using any other fluid.

The GCU 104 is configured to control, monitor, and/or protect an APU generating channel. It regulates an output voltage of the APU 100 to nominal at the point-of-regulation (POR). Certain functions of the GCU 104 can be implemented in software, firmware, logic circuits, or a combination thereof. In some embodiments, the GCU 104 is part of an integrated control platform and interacts with a control protection device, such as a solid state power controller.

In some embodiments, the APU 100 is part of a more electric aircraft (MEA), whereby secondary energy sources aboard the aircraft are electric. In some embodiments, the APU 100 is part of a bleedless system, whereby bleed air (i.e. compressed air) is replaced with extra electric generation.

Figure 2:
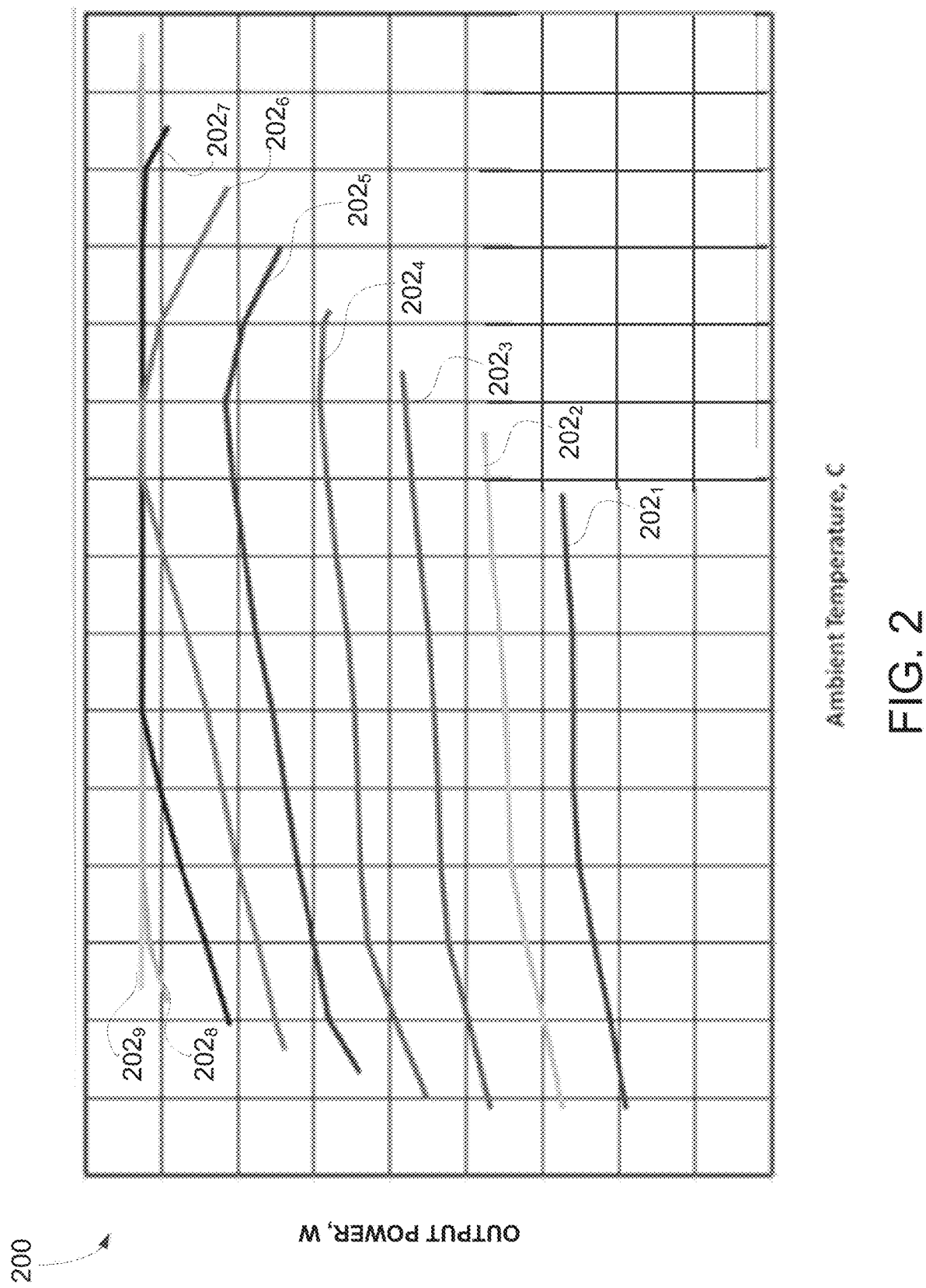
FIG. 2 is a graph of ambient temperature v. output power for a plurality of aircraft altitudes.

With reference to FIG. 2, the APU 100 has an operating envelope that spans a wide range of output power values, as a function of one or more external environment parameters of the aircraft. In some embodiments, the external environment parameters of the aircraft are ambient temperature and altitude. Other external environment parameters, such as aircraft speed, may also apply. For the purposes of the present disclosure, ambient temperature refers to the temperature of the air outside of the aircraft. Output power is depicted along the y-axis of the graph 200, ambient temperature is depicted along the x-axis. Curves $202_1$-$202_9$ represent the available output power for the APU 100 at varying ambient temperatures for different altitudes of the aircraft.

The available output power is lower for higher aircraft altitudes than it is for lower aircraft altitudes. For example, curves $202_1$-$202_9$ may represent altitudes of 45,000 ft ($202_1$); 42,000 ft ($202_2$); 39,000 ft ($202_3$); 36,000 ft ($202_4$); 33,000 ft ($202_5$); 30,000 ft ($202_6$); 27,000 ft ($202_7$); 24,000 ft ($202_8$); and 21,000 ft ($202_9$), respectively. The output power may span 20 kW to several hundred kW, and the temperature may range from −75° C. to −5° C. In this example, the APU 100 is capable of supporting 500 kW of electrical power below an altitude of 21,000 ft, but not more than 75 kW in cruise at 45,000 ft. These values are exemplary only.

In order to make use of the full power available for the APU 100, a dynamic overcurrent protection is implemented in the GCU 104. Using the dynamic overcurrent protection, the generator 102 may be operated at any output power of the operating envelope of the APU 100. The available output power is determined as a function of external environment parameters of the aircraft, such as aircraft altitude and ambient temperature, and the overcurrent protection threshold is set to a level associated with the available output power.

Figure 3:
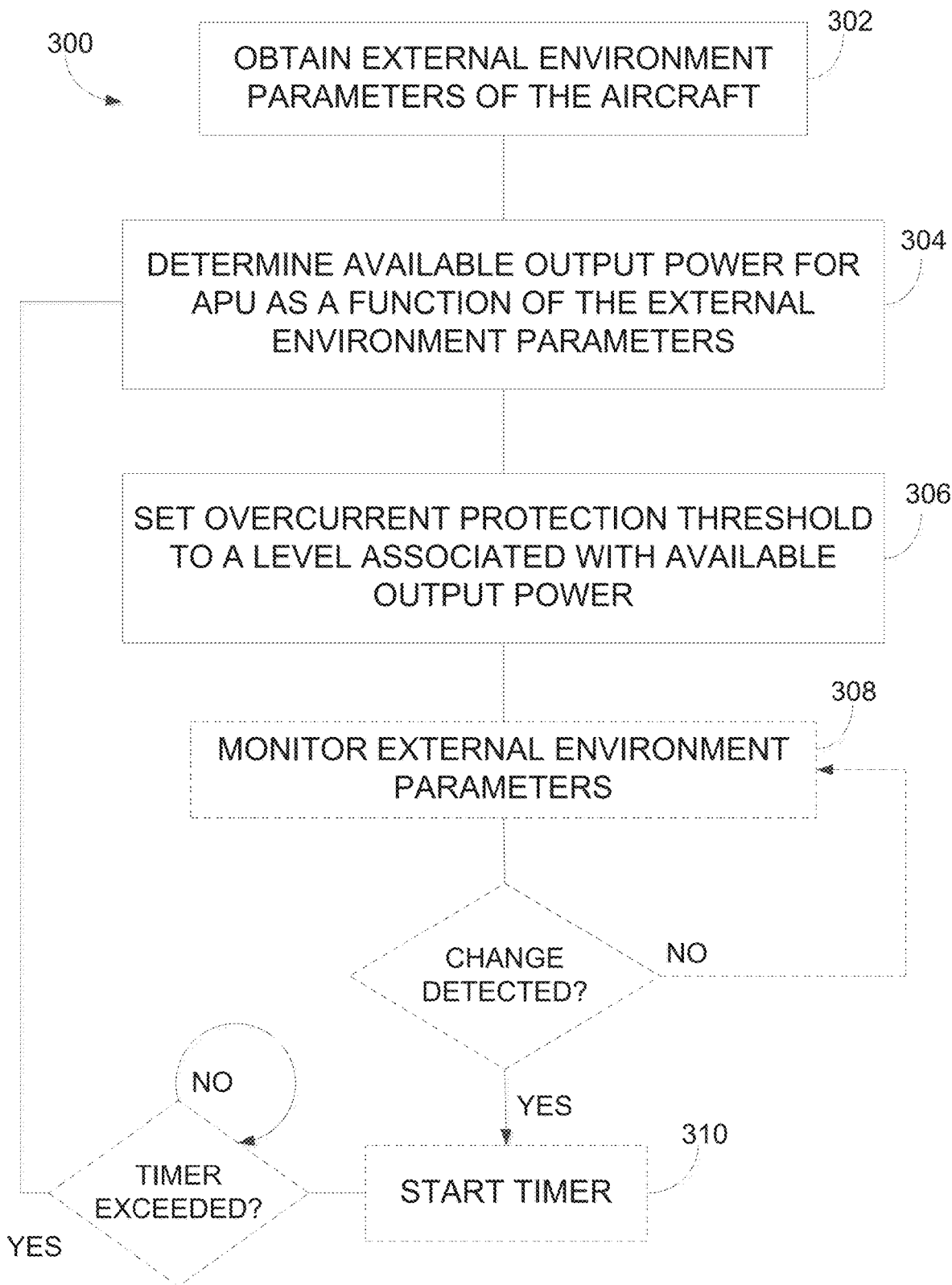
FIG. 3 is a flowchart of an example method for operating an auxiliary power unit.

Referring to FIG. 3, there is illustrated an example method 300 for operating an APU, such as APU 100. At step 302, external environment parameters of the aircraft are obtained. In some embodiments, the external environment parameters are obtained via a direct measurement thereof, using one or more sensors provided on the aircraft. For example, a temperature sensor on the exterior of the aircraft may be used to measure ambient temperature; a pressure sensor may be used to measure atmospheric pressure in order to determine altitude. In some embodiments, the external environment parameters of the aircraft are obtained from one or more other devices aboard the aircraft, such as an engine computer and/or an aircraft computer. Obtaining external environment parameters as per step 302 may be passive, i.e. the parameters are received without prompt, or active, i.e. the parameters are received when requested.

Figure 4A:
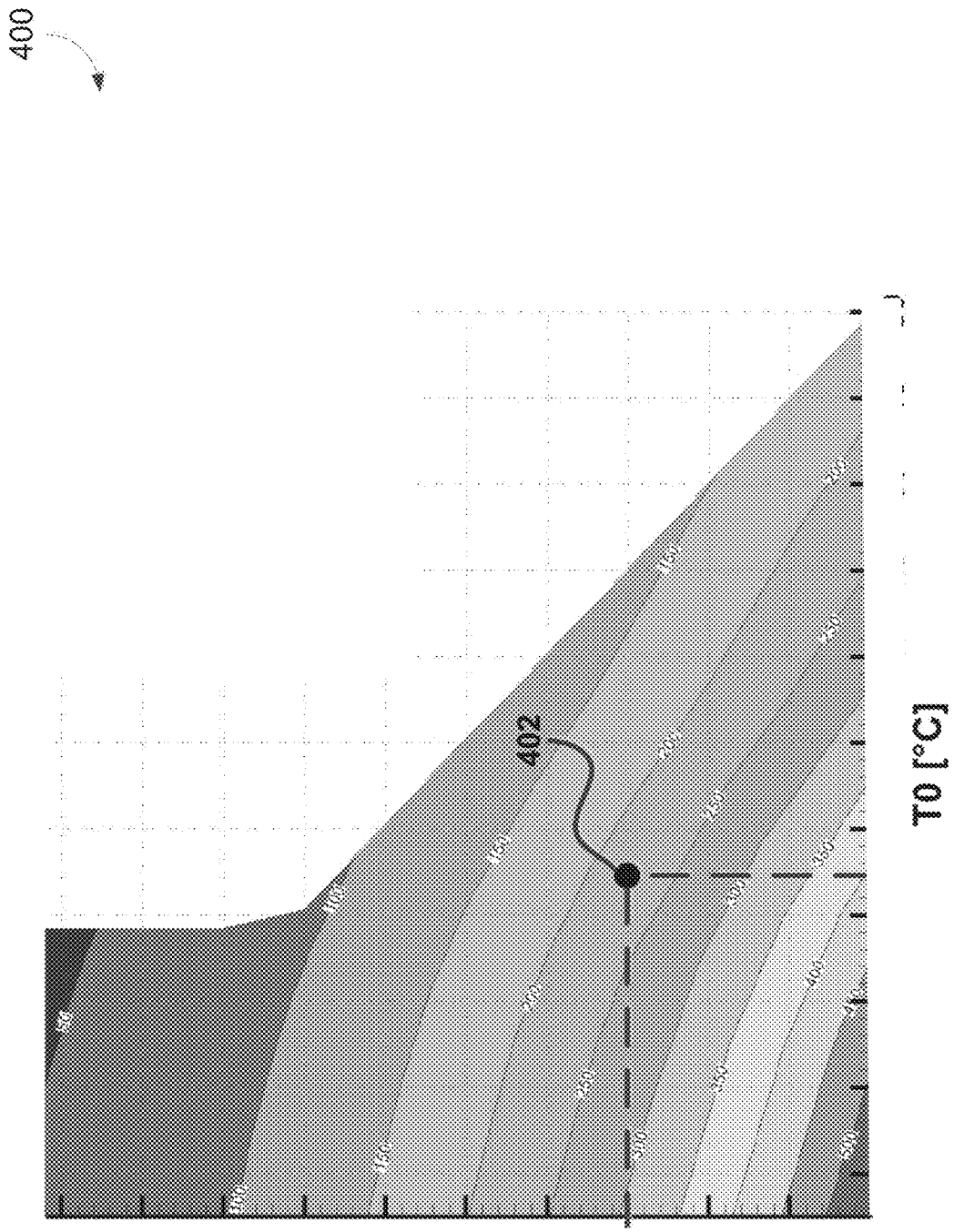
FIG. 4A is a graph of ambient temperature v. altitude.

At step 304, an available output power for the APU is determined as a function of the external environment parameters. In some embodiments, determining the available output power from the environment parameters comprises selecting the available output power from a look-up table, which can also be represented by an array, a matrix, or a graph. An example is illustrated in FIG. 4A using altitude and ambient temperature as indexing variables to determine an available output power. The graph 400 provides a plurality of power settings (i.e. from 50 kW to 500 kW) as a function of altitude and ambient temperature. An altitude of 15,000 ft and an ambient temperature of −15° C. are shown to intersect at a point 402 that corresponds to a power setting of 200 kW. These values are exemplary only.

Figure 4B:
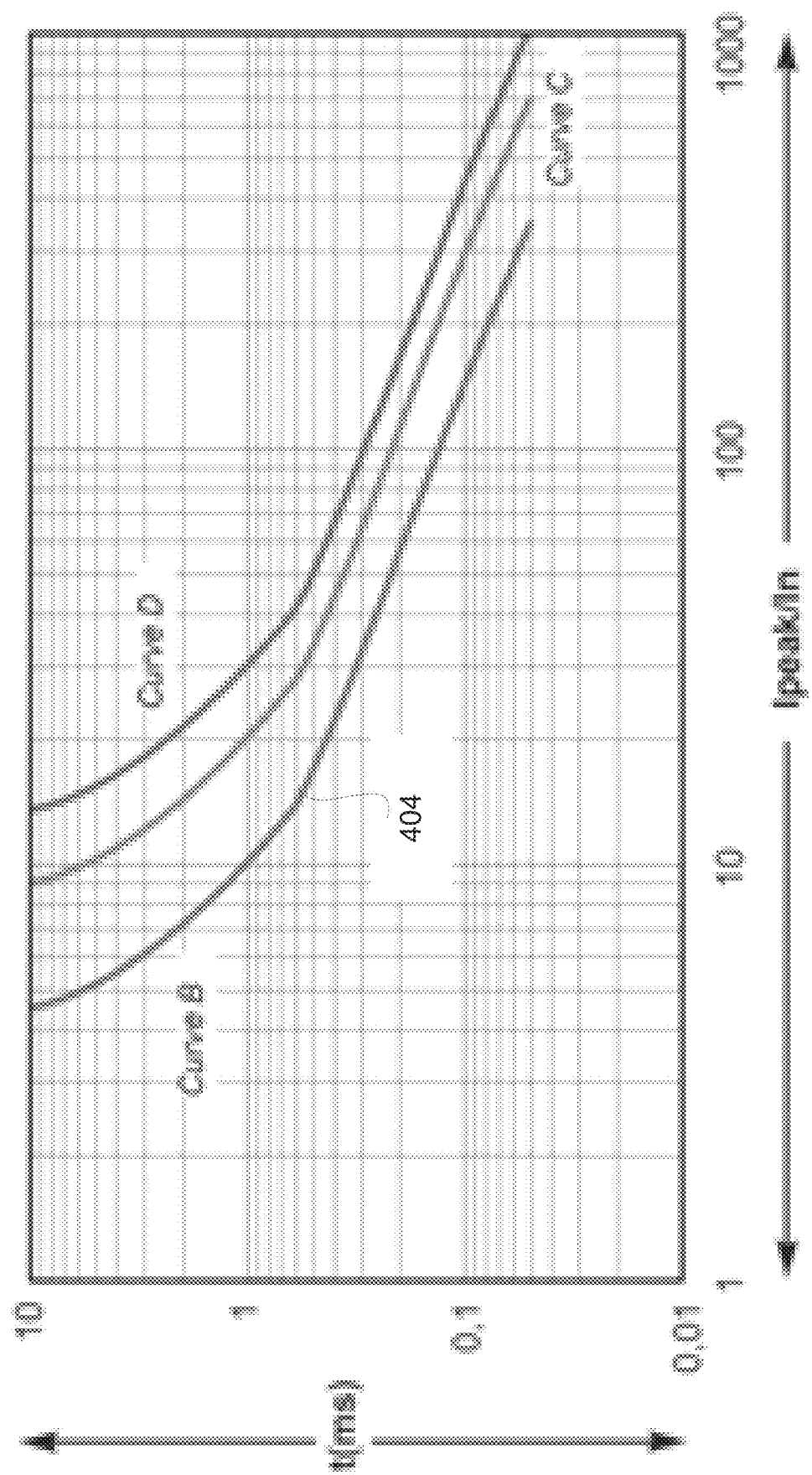
FIG. 4B illustrates example tripping curves.

In order to determine a tripping-point current, fault current and breaking time are considered. For example, based on curve 404 in FIG. 4B, a circuit breaker at Ipeak/I will interrupt a current of 10 times the rated current I in 1.0 millisecond.

In some embodiments, the corresponding current is retrieved from a tripping-curve-lookup table, whereby the conversion from power to current is computed and the numerical value is stored for a plurality of power settings.

Once the current I is determined, the overcurrent protection threshold may be set to the value of Ipeak/I, where Ipeak is a peak inrush current. In some embodiments, the overcurrent protection threshold is set to I+delta, where delta is a buffer allowing the current of the APU to exceed I by a small margin, such as 1%, 3%, 5%, or any other suitable margin. The value for delta may be found through testing, simulation, and/or using historical data.

In some embodiments, a tripping-curve-lookup table associates the available output power directly to an overcurrent protection threshold.

Referring back to FIG. 3, at step 306, an overcurrent protection threshold of the APU is set to a level associated with the available output power. The overcurrent protection threshold corresponding to a level associated with the available output power is applied to the generator 102 by the GCU 104. In operation, the APU 100 will initiate a trip, or disconnection, if the overcurrent protection threshold is exceeded.

At optional step 308, the external environment parameters are monitored after having dynamically set the overcurrent protection threshold as per steps 302-306. When a change is detected, a timer may be started at step 310. Available output power is updated based on the new values for the external environment parameters, and an overcurrent protection threshold is set for the associated power consumption.

In some embodiments, a change in external environment parameters is only detected when one or more of the parameters changes by a minimum value, such as 1° C., 5° C., or 10° C. for temperature, or 1000 ft, 3000 ft, or 5000 ft for altitude. The external environment parameters may be associated with predetermined bands, whereby a change is detected when a value is found to change bands. An example is shown in TABLE 1 below.

TABLE 1

| Altitude | Band |
| --- | --- |
| 0-15,000 ft | 1 |
| 15,001-20,000 ft | 2 |
| 20,0001-25,000 ft | 3 |
| 25,001 ft-30,000 ft | 4 |

In some embodiments, a change is only detected if a change in band occurs and a change in value comprises a difference of more than a given threshold. For example, an altitude changing from 14,900 ft to 15,025 ft would not cause a change to be detected if the value threshold is set to 200 ft. This would prevent oscillation between bands unless the change to the parameter is more significant. Other embodiments may apply depending on practical implementations.

In some embodiments, when the overcurrent protection threshold is set to a new value, it is compared to an actual current of the APU. In circumstances where the available output power is lowered, there may be a need to shed one or more loads in order to comply with the new overcurrent protection threshold. A timer may be used to allow such load shedding without triggering a trip or disconnect of the APU. Alternatively or in combination therewith, the comparison of the overcurrent protection threshold to an actual current of the APU is performed before setting the overcurrent protection threshold to a new level, to allow for load shedding prior to applying the new setting. The comparison may be done concurrently with step 304 prior to step 306, concurrently with step 306, or subsequently to step 306, depending on practical implementations.

The method 300 may be used to set the size of the generator 102 such that the entire power range of the APU 100 is available. In some scenarios, this means allowing for a larger generator to be able to provide maximum electrical power in low altitudes or on the ground. This may mean that fewer smaller sized APUs need to be provided on an aircraft if a single APU can provide power at varying points of its operating envelope and can therefore replace two or more APUs limited in their available output power. As an example, without dynamic control of overcurrent protection, an APU can deliver 30 kW at 30,000 ft and 30 kW at 10,000 ft. With dynamic control of overcurrent protection, the APU overcurrent protection threshold can be set for 75 kW when the aircraft is at 10,000 ft and for 30 kW when the aircraft is at 30,000 ft.

The method 300 may be used to reduce load shedding, by increasing the available output power of the generator at lower altitudes. In some embodiments, the method 300 is used in conjunction with a smart load shedding system. In a smart load shedding system, the various electrical loads of the aircraft are assigned priority levels and the lower priority level loads are shed before the higher priority level loads. A smart load shedding system may be configured to determine if more output power is available from the APU, for example by sampling external environment parameters when an increase in electrical load is needed, and comparing to a current setting of the APU. When possible, the overcurrent protection threshold may be modified instead of performing load shedding, depending on the hysteresis band implemented to act and not act. This provides additional electrical load management flexibility, an increased power budget, and a reduced risk of electrical overloading.

Figure 5:
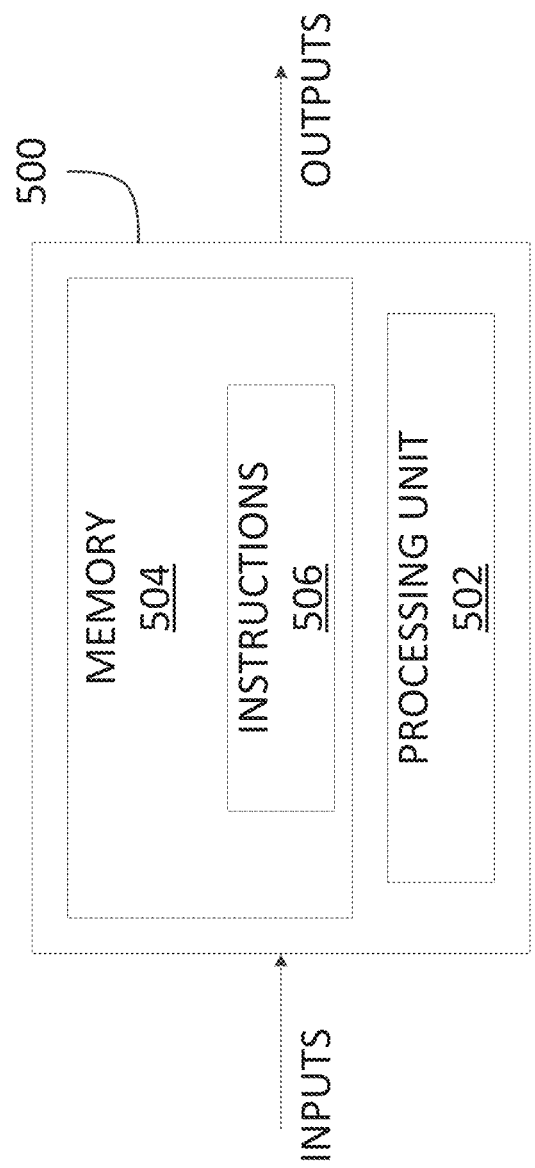
FIG. 5 is a block diagram of an example computing device.

FIG. 5 is an example embodiment of a computing device 500 for implementing parts or all of the method 300 described above. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method 300 described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to the device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 602.

It should be noted that the computing device 500 may be implemented as part of a Full Authority Digital Engine Control (FADEC) or other similar device, including an electronic engine control (EEC), engine control unit (EUC), engine electronic control system (EECS), an Aircraft Avionics System, and the like. In addition, it should be noted that the techniques described herein can be performed by a computing device 500 substantially in real-time.

The methods and systems for operating an APU as described herein may be implemented in a high level procedural or object oriented programming or scripting language, or a combination thereof, to communicate with or assist in the operation of a computer system, for example the computing device 500. Alternatively, the methods and systems for operating an APU may be implemented in assembly or machine language. The language may be a compiled or interpreted language. Program code for implementing the methods and systems for operating an APU may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an APU may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for operating an APU may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. The scope of the following claims should not be limited by the embodiments set forth in the examples, but should be given the broadest reasonable interpretation consistent with the description as a whole.

The invention claimed is:

1. A method for operating an auxiliary power unit (APU) of an aircraft, the method comprising:
   obtaining external environment parameters of the aircraft at a current altitude of the aircraft;
   determining an available output power for the APU as a function of the external environment parameters;
   setting an overcurrent protection threshold of the APU to a level associated with the available output power;
   lowering the current altitude of the aircraft; and
   after lowering the current altitude of the aircraft, increasing the overcurrent protection threshold of the APU.

2. The method of claim 1, wherein the external environment parameters comprise the current altitude of the aircraft and outside air temperature.

3. The method of claim 1, wherein obtaining the external environment parameters comprises measuring the external environment parameters.

4. The method of claim 1, further comprising comparing the overcurrent protection threshold to an actual current of the APU and shedding electrical loads when the actual current exceeds the overcurrent protection threshold.

5. The method of claim 1, further comprising:
   detecting a change in the external environment parameters by obtaining updated external environment parameters;
   determining an updated available output power as a function of the updated external environment parameters; and
   setting an updated overcurrent protection threshold of the APU to a level associated with the updated available output power.

6. The method of claim 5, wherein setting the updated overcurrent protection threshold comprises applying a time delay to confirm the updated external environment parameters.

7. The method of claim 5, further comprising performing load management as a function of the updated overcurrent protection threshold.

8. The method of claim 1, wherein the APU operates as a generator in a bleed or bleedless system.

9. The method of claim 1, wherein setting the overcurrent protection threshold comprises selecting the overcurrent protection threshold from a list of predetermined overcurrent protection thresholds having respective output power ranges associated thereto.

10. The method of claim 1, wherein determining an available output power comprises selecting the available output power from a look-up table.

11. A system for operating an auxiliary power unit (APU) of an aircraft, the system comprising:
    a processing unit; and
    a non-transitory computer readable medium having stored thereon program instructions executable by the processing unit for:
       obtaining external environment parameters of the aircraft at a current altitude of the aircraft;
       determining an available output power for the APU as a function of the external environment parameters;
       setting an overcurrent protection threshold of the APU to a level associated with the available output power; and
    after the current altitude of the aircraft has been lowered, increasing the overcurrent protection threshold of the APU.

12. The system of claim 11, wherein the external environment parameters comprise altitude of the aircraft and outside air temperature.

13. The system of claim 11, wherein obtaining the external environment parameters comprises measuring the external environment parameters.

14. The system of claim 11, wherein the program instructions are further executable for comparing the overcurrent protection threshold to an actual current of the APU and shedding electrical loads when the actual current exceeds the overcurrent protection threshold.

15. The system of claim 11, wherein the program instructions are further executable for:
detecting a change in the external environment parameters by obtaining updated external environment parameters;
determining an updated available output power as a function of the updated external environment parameters; and
setting an updated overcurrent protection threshold of the APU to a level associated with the updated available output power.

16. The system of claim 15, wherein setting the updated overcurrent protection threshold comprises applying a time delay to confirm the updated external environment parameters.

17. The system of claim 15, wherein the program instructions are further executable for performing load management as a function of the updated overcurrent protection threshold.

18. The system of claim 11, wherein setting the overcurrent protection threshold comprises selecting the overcurrent protection threshold from a list of predetermined overcurrent protection thresholds having respective output power ranges associated thereto.

19. The system of claim 11, wherein determining an available output power comprises selecting the available output power from a look-up table.

20. A non-transitory computer-readable medium having stored thereon program instructions executable by a processor for operating an auxiliary power unit (APU) of an aircraft, the program instructions configured for:
obtaining external environment parameters of the aircraft at a current altitude of the aircraft;
determining an available output power for the APU as a function of the external environment parameters;
setting an overcurrent protection threshold of the APU to a level associated with the available output power; and
after the current altitude of the aircraft has been lowered, increasing the overcurrent protection threshold of the APU.

* * * * *